United States Patent [19]
Chesney, Jr.

[11] 4,402,752
[45] Sep. 6, 1983

[54] DRY-SET MORTAR COMPOSITION HAVING ENHANCED BONDING CHARACTERISTICS

[75] Inventor: Joseph J. Chesney, Jr., Plainsboro, N.J.

[73] Assignee: Tile Council of America, Inc., Princeton, N.J.

[21] Appl. No.: 370,082

[22] Filed: Apr. 20, 1982

Related U.S. Application Data

[63] Continuation of Ser. No. 243,561, Mar. 13, 1981, abandoned, which is a continuation-in-part of Ser. No. 198,155, Oct. 17, 1980, abandoned.

[51] Int. Cl.³ .............................................. C04B 7/353
[52] U.S. Cl. ........................................ 106/93; 106/98
[58] Field of Search ...................... 106/93, 98, DIG. 4

[56] References Cited

U.S. PATENT DOCUMENTS

| | | | |
|---|---|---|---|
| 4,021,257 | 5/1977 | Bernett | 106/93 |
| 4,043,827 | 8/1977 | Bernett | 106/93 |

*Primary Examiner*—James Poer
*Attorney, Agent, or Firm*—Morgan, Finnegan, Pine, Foley & Lee

[57] ABSTRACT

Dry-set mortar compositions adapted to be mixed with water containing, in the dry state, sand, Portland cement and a cellulose ether improved by the inclusion of anionic polyacrylamide and Bentonite Clay.

5 Claims, No Drawings

DRY-SET MORTAR COMPOSITION HAVING ENHANCED BONDING CHARACTERISTICS

CROSS-REFERENCE TO RELATED APPLICATIONS

This application is a continuation of application Ser. No. 243,561, filed Mar. 13, 1981, which in turn is a continuation-in-part of application Ser. No. 198,155, filed Oct. 17, 1980 both now abandoned.

BACKGROUND OF THE INVENTION

1. Field of the Invention

This invention relates to mortar compounds for setting tile and in particular for setting ceramic tile. More particularly, the invention relates to dry set mortar compositions which, in addition to being sag resistant, have high bond strength.

2. Description of the Prior Art

At present, tile and particularly ceramic tile is set in many cases by dry-set Portland cement mortars. Prior to the advent of dry-set mortars, the Portland cement compositions that were used had to be applied to the substrate in a very thick bed and generally also required a thin mortar coat for setting the tile. These thick bed mortar setting methods were referred to as mud-method tile setting systems. The mud-method Portland cement mortars have now been replaced to a great extent by thin-bed Portland cement dry-set mortars. Typical dry-set mortars are principally comprised of Portland cement, sand, and a water retentive cellulose ether, such as methyl cellulose or hydroxyethyl cellulose. The dry-set mortars are generally delivered to the job site in the dry state and water is added on the job site to mix the mortar into a slurry. U.S. Pat. No. 2,934,932 (Wagner; issued May 3, 1960) and U.S. Pat. No. 3,243,307 (Selden; issued Mar. 29, 1966) are illustrative of the dry-set mortars which are currently used to set tile in thin-beds. In addition, dry-set mortars can be provided with a rubber or polymer latex which is added to the dry mix to make a mortar which is then called a latex Portland cement mortar.

The dry-set mortars both with and without latex may also contain additives to provide or improve specific properties.

Originally, the dry-set mortars also contained asbestos fibers or similar fibrous materials which provided the mortar with the sag resistance. Sag resistance is a property or a characteristic relating to the ability of the mortar to resist movement under load until a certain load level is reached. This property or characteristic is vitally important in dry-set mortars and also to a latex mortar since a mortar, to be functional, must be in a slurry or paste form on the one hand, but also must be capable of supporting the load imposed on it by the tiles set in the mortar. It is therefore very important that the mortar support the tile without any appreciable slippage of the tile from the trowelled mortar surface during the period in which the mortar is setting. In wall applications, sag resistance is even more critical because the mortar must hold the tile in position on the wall during the period in which the mortar is setting. Sag resistance is defined by a test method that is part of the American National Standard Specification for Dry-Set Portland Cement Mortars-A1118.1.

Recently the tile industry, lead by the Tile Council of American Inc., has developed dry-set mortars which do not require the use of asbestos fibers. Rather than asbestos fibers, the dry-set mortars have been provided with other additives to afford sag resistance. U.S. Pat. No. 4,082,563 (Ellis et al; issued Apr. 4, 1978) discloses a dry-set mortar containing hydrated and anhydrous salts and similar ingredients to provide sag resistance rather than the asbestos.

Tile Council of America has also developed a superior asbestos-free dry-set mortar which contains long chain organic polymers. Anionic and nonionic long chain polyacrylamide materials are illustrative of the long chain organic polymers which provide the new improved mortar with sag resistant characteristics. The use of montmorillonite clays, attapulgite clays and mixtures of these clays have also been developed for use in mortars both alone and in combination with the long chain organic polymers. These developments are set forth in U.S. Pat. Nos. 4,021,257 (Bernett, May 3, 1977) and 4,043,827 (Bernett, Aug. 23, 1977).

SUMMARY OF THE INVENTION

It is now been found that the new improved high sag resistant dry-set mortars can be provided with enhanced bond strength by using a critical formulation.

It is an object of the present invention to provide a dry-set mortar having good sag resistance and high bond strength without the use of asbestos fibers.

It is a further object of the present invention to provide a dry-set mortar which has an improved skinning characteristic which as a necessary concomitant affords enhanced bonding.

In brief the composition of the invention is a Portland cement based mixture comprised of Portland cement, sand, about 0.5 to 0.6 parts by weight of a cellulose ether and from 0.007 to 0.015 parts by weight of an anionic polyacrylamide. The composition is improved by from 0.0 to 0.9 Sodium Bentonite Clay. Additives are also included in the preferred embodiment of the composition. Thus, the composition provides a mortar having excellent sag resistance and in addition enhanced bond strength.

DESCRIPTION OF THE PREFERRED EMBODIMENT

The invention of this application is a composition which is used to set ceramic tile, bricks, small stones and other similar products both on walls and on floors. The composition has suitable properties for holding the tile or other material on the wall or floor securely and firmly and is capable of adjusting for elavational differences in the tiles on the floor and for irregular positioning of tiles on the wall.

One of the most significant properties of the mortar is bond strength. Bond strength is the capacity or capability of the mortar to hold tile on the wall or floor long after the mortar has set. In effect, it is the property which determines how tenaciously the tile or other material that is being set, can be held to the wall or floor by the mortar.

One of the phenomena that relates to bond strength is known as skinning. Skinning is a condition that occurs in part, as a result of chemicals in the mortar composition. Although the applicant is not committed to or bound by any theory, it is believed that skinning will be more prominent when chemicals having crosslinking or matrix forming characteristics are used in a composition. Skinning is the formation of a thin-skin or a membraneous film over the surface of the mortar. In effect, the skin or membrane acts as a barrier between the tacky mortar material and the bisque or lower surface of the tile to which the mortar must adhere in order to hold the mortar on the wall or floor. In practice, the placing of a tile on mortar which has the skin or membrane formed on the surface will destroy or rupture some of the membrane thereby exposing the tacky adhesive mortar to the bisque in the portion where the skin has been destroyed. It is axiomatic that the more skin that is ruptured, the more tacky mortar will be exposed to the tile bisque and the more mortar there is to hold and retain the tile on the wall or floor. Accordingly, the more skin that is destroyed or conversely the less skin that is present to form a barrier between the tacky mortar material and the bisque, the more surface area will be covered with mortar and the bond between the mortar and the individual tile will be greater since more mortar is directly exposed and adhering to the tile.

Thus, the composition of the present invention has been found to provide an ideal mortar composition wherein the sag resistance is as good as the sag resistance provided by any prior art composition including the Wagner and Selden dry-set asbestos fiber compositions and the Bernett organic polymer dry-set mortars. In addition, the skinning is held to a minimum thereby providing enhanced bond strength for the mortar.

The composition of the mortar of the present invention in the dry state includes the customary or conventional dry-set mortar ingredients, such as, sand, Portland cement, gelvatol 9000 (polyvinyl alcohol) and additives, such as, colloids 770 DD and urea, and approximately 0.5-0.6 parts by weight of a cellulose ether, such as, methyl cellulose, hydroxyethyl cellulose, hydroxypropyl cellulose, etc. The critical ingredient both quantitatively and qualitatively in the composition is an anionic polyacrylamide used in a proportion from 0.008 to 0.015 parts by weight of the dry composition. In addition, the use of Bentonite Clay in a proportion of 0.0 to 0.9 improves the composition. It is noted that of the Bentonite Clays, Sodium Bentonite Clay is somewhat more suitable than the others, such as, Magnesium or Calcium. In use, the dry composition is mixed with water to provide a slurry.

The following examples have been run for both sag resistance and skinning. The examples have been run using a base composition and varying the polyacrylamide and cellulose ether component. The base composition for Examples 1 through 5 is chosen to provide a mortar suitable for setting wall tiles. The base composition for examples 1-5 is comprised of 50 parts sand, 0.18 parts polyvinyl alcohol, 0.5 parts Sodium Bentonite Clay and 48.72 parts Portland cement. The sand used in the examples is a Grade D sand which is a clean, graded, white silica sand having a particle size wherein not more than 10% pass 140 mesh, not more than 3% remain on 30 mesh and which peaks on 70 mesh. The Portland Cement is Type 1 conforming the ASTM Standard Specification C 150. The following chart shows the ingredients added to the base composition in each respective example and the resultant performance of the mortar when tested for skinning and sag resistance. All parts are by weight.

The methyl cellulose ingredient used in the examples is the Dow Chemical Company type K 4M which has a viscosity of 3,700 to 4,300 centipoises (2.00% aqueous 20° C.). The anionic polyacrylamide used in the examples is SEPARAN AP 273 which is also a Dow Chemical Company product. Further, the preferred range for Sodium Bentonite Clay for wall mortar is 0.3-0.8% by weight.

EXAMPLES 1-5

| | | | 25 ml of Water 100 gms of dry mix | | | | | | |
|---|---|---|---|---|---|---|---|---|---|
| | METHYL CELLULOSE K 4M | POLYACRYLAMIDE AP 273 | SAG RESISTANCE (1/64 in.) | | | | SKINNING (Min.) | | |
| EXAMPLE | (Parts by wt.) | (Parts by wt.) | A | B | C | D | 0 | 5 | 10 |
| 1 | 0.5854 | 0.0146 | 1.5 | 1.5 | — | — | 1520 | 385 | 153 |
| 2 | 0.5882 | 0.0118 | 1.0 | 3.0 | 1.0 | 1.0 | 1630 | 332 | 101 |
| 3 | 0.5896 | 0.0103 | 2.0 | 2.5 | — | — | 1400 | 598 | *— |
| 4 | 0.5902 | 0.0098 | 3.5 | 0.5 | 1.5 | 1.5 | 1550 | 650 | 222 |
| 5 | 0.5915 | 0.0085 | 2.75 | 2.5 | — | — | 1980 | 256 | 50 |

*Paper tore from sheetrock

The following Examples 6 through 10 are shown with the polyacrylamide and methyl cellulose ingredients added to a base floor mortar mix. The floor mortar mix is comprised of 60 part by weight sand (grade B), 0.12 parts by weight polyvinyl alcohol, 0.08 parts by weight anti-foam (COLLOIDS 770 DD), 0.08 parts by weight urea, and 0.075 parts by weight Sodium Bentonite Clay with the remainder Portland Cement to total 100 parts by weight. The preferred range for Sodium Bentonite Clay for floor mortar is 0.075 to 0.8 parts by weight.

The following display shows the methyl cellulose and polyacrylamide added for each respective example and the performance of the mortar in both sag resistance and skinning.

EXAMPLES 6-10

| | | | 25 Ml of Water 100 gms of dry mix | | | | | | |
|---|---|---|---|---|---|---|---|---|---|
| | METHYL CELLULOSE K 4M | POLYACRYLAMIDE AP 273 | SAG RESISTANCE (1/64 in.) | | | | SKINNING (Min.) | | |
| EXAMPLE | (Parts by wt.) | (Parts by wt.) | A | B | C | D | 0 | 5 | 10 |
| 6 | 0.5073 | 0.0127 | 2.0 | 1.0 | — | — | 760 | 277 | 46 |
| 7 | 0.5098 | 0.0102 | 1.0 | 1.5 | — | — | 788 | 444 | 112 |
| 8 | 0.5110 | 0.0090 | 5.5 | 4.0 | 1.0 | 2.5 | 648 | 686 | 382 |
| 9 | 0.5115 | 0.0085 | 4.0 | 3.5 | — | — | 918 | 482 | 340 |

EXAMPLES 6-10-continued

25 Ml of Water
100 gms of dry mix

| EX-<br>AMPLE | METHYL<br>CELLULOSE<br>K 4M<br>(Parts by wt.) | POLYACRYLAMIDE<br>AP 273<br>(Parts by wt.) | SAG RESISTANCE<br>(1/64 in.) | | | | SKINNING<br>(Min.) | | |
|---|---|---|---|---|---|---|---|---|---|
| | | | A | B | C | D | 0 | 5 | 10 |
| 10 | 0.5127 | 0.0073 | 3.5 | 8.5 | 4.5 | 4.5 | 1057 | 763 | 740 |

The sag resistance figures displayed in the Examples 1 through 10 are shown in terms of 64ths of an inch. For example, the two tiles that were tested for sag resistance when set with the mortar of Example 1 show a sag of 1.5/64ths of an inch. The mortar of Example 3 showed respectively 2/64ths and 2.5/64ths of an inch sag. The sag resistance values were obtained by testing in accordance with the procedures for measuring "sag on vertical surfaces" from the American National Standards Specification For Dry-Set Portland Cement Mortar-A1118.1-1967.

The sag resistance results can be evaluated by a comparison with the performance characteristics for mortars set forth in col. 11, lines 51-56 U.S. Pat. No. 4,021,257 wherein a sag of 0 to 2/64ths is excellent. A sag of 2/64ths to 8/64ths is very good. A sag of 8/64ths to 16/64ths is good. A sag of 16/64ths to 64/64ths is fair and anything over 64/64ths is regarded as poor.

Accordingly, the sag resistance for the mortars of Examples 1 through 10 is excellent in all respects with the exception of Example 10 and there performance is very good.

The skinning test is also performed in accordance with American National Standard Institute Test A1118.4. The test determines the shear bond strength of the mortar after various intervals. The results reported are in terms of pounds of shear bond load. The figures indicate the load in pounds that is required to break the bond for the respective tests. The higher the figure, the greater the load required to break the bond.

Conventional asbestos and polyacrylamide dry-set floor and wall mortars were also tested against the dry-set mortar of this invention. In one example the mortars were tested when mixed in a ratio of 25 milliliters of water to 100 grams of dry composition and in another, the water dry composition mix was made under conditions simulating field conditions. The composition of the Wall Mortar of the Invention for Example 11 is 50 parts by weight said (Grade D), 0.18 parts by weight polyvinyl alcohol, 0.7 parts by weight Sodium Bentonite Clay, 0.511 parts by weight K 4M methyl cellulose and 0.009 parts by weight SEPARAN AP 273, with the remainder Portland Cement to obtain 100 parts by weight for the mix.

The composition fo the Floor Mortar of the Invention for Example 11 to 60 parts by weight sand (Grade B), 0.12 parts by weight polyvinyl alcohol, 0.08 parts by weight urea, 0.12 parts by weight Sodium Bentonite Clay, 0.10 parts by weight anti-foam (COLLOIDS DD), 0.5896 parts by weight K 4M methyl cellulose and 0.0103 parts by weight SEPARAN AP 273 with the remainder Portland Cement to obtain 100 parts by weight for the mix. The results of the comparative tests are as follows:

EXAMPLE 11

| MORTARS OF<br>THE INVENTION | SAG<br>RESISTANCE<br>1/64 In. | SKINNING (lbs.) | | | | |
|---|---|---|---|---|---|---|
| | | 5 | 10 | 15 | 20 | 25 (Min.) |
| Floor Mortar | | | | | | |
| 25 ml H₂O/100 gms | 2.0 | 767 | 422 | 123 | | |
| field mix | 5.0 | | | 835 | 337 | 713 |
| Wall Mortar | | | | | | |
| 25 ml H₂O/100 gms | 2.5 | 419 | 285 | 0 | | |
| field mix | 2.0 | | | 612 | 429 | 69 |
| CONVENTIONAL<br>ASBESTOS MORTAR | | | | | | |
| Floor Mortar | | | | | | |
| 25 ml H₂O/100 gms | 25.25 | 842 | 392 | 462 | | |
| field mix | failed | | | 708 | 555 | 248 |
| Wall Mortar | | | | | | |
| 25 ml H₂O/100 gms | 30.75 | 1545 | 914 | 608 | | |
| field mix | failed | | | 826 | 629 | 308 |
| CONVENTIONAL<br>POLYACRYLAMIDE MORTAR | | | | | | |
| Floor Mortar | | | | | | |
| 25 ml H₂O/100 gms | 2.5 | 651 | 388 | 24 | | |
| field mix | 3.5 | | | 533 | 333 | 216 |
| Wall Mortar | | | | | | |
| 25 ml H₂O/100 gms | 2.5 | 900 | 98 | 0 | | |
| field Mix | 3.0 | | | 1024 | 106 | 8 |

The comparison shows that the bond strength and sag resistance of the mortar of the invention are improved over the conventional polyacrylamide mortar and the bond strength of the mortar of the invention is about the same as the bond strength of the asbestos mortar but the sag resistance is greatly improved.

It has also been discovered that the improved mortars of the invention perform superior to prior art mortars if clay is absent from the formulation. The following examples illustrated the performance of mortar formulations of the invention formulated without clay. The compositions for Examples 11-15 are as follows:

| INGREDIENT | EXAMPLE 12 PARTS BY WEIGHT | EXAMPLE 13 PARTS BY WEIGHT | EXAMPLE 14 PARTS BY WEIGHT | EXAMPLE 15 PARTS BY WEIGHT |
|---|---|---|---|---|
| SAND "B" | | | 3000 | 3000 |
| SAND "D" | 2500 | 2500 | | |
| PORTLAND CEMENT | 2461 | 2461 | 1961.5 | 1961.5 |
| METHYL CELLULOSE (K 4M) | 29.48 | 29.58 | 24.07 | 24.15 |
| POLYACRYLAMIDE (SEPARAN AP 273) | .52 | .42 | .43 | .35 |
| POLY VINYL ALCOHOL (GELVATOL 9000) | 9.0 | 9.0 | 6.0 | 6.0 |
| ANTI-FOAM (COLLOIDS 770 DD) | | | 4.0 | 4.0 |
| UREA | | | 4.0 | 4.0 |

The mortars of Examples 12–15 were mixed at field consistency. The performance of the mortars obtained by sag resistance and skinning tests set forth earlier in this specification are:

when the skinning test is extended to determine the performance over a longer period of time.

The following data enables a comparison:

| | Ml WATER 100 gm | SKINNING (lbs.) | | | | | |
|---|---|---|---|---|---|---|---|
| | | 15 (Min.) | 20 | 25 | 30 | 35 | 40 |
| CONVENTIONAL Asbestos Floor Mortar | 26.5 | 852 | 513 | 443 | 415 | 46 | 52 |
| CONVENTIONAL Polyacrylamide Floor Mortar | 26.5 | 660 | 367 | 32 | 0 | 0 | 0 |
| CONVENTIONAL Asbestos Wall Mortar | 26.5 | 1158 | 653 | 578 | 0 | 0 | 0 |
| CONVENTIONAL Polyacrylamide Wall Mortar | 26.5 | 40 | 0 | 0 | 0 | 0 | 0 |
| FLOOR MORTAR of Patent with Clay | 28.5 | 500 | 370 | 416 | 159 | 36 | 0 |
| WALL MORTAR of Patent with Clay | 28.0 | 606 | 295 | 240 | 65 | 190 | 0 |
| Example 11 | 27.5 | 522 | 560 | 535 | 15 | 0 | 0 |
| Example 12 | 27.5 | 951 | 660 | 152 | 0 | 0 | 0 |
| Example 13 | 26.5 | 857 | 860 | 692 | 30 | 0 | 0 |
| Example 14 | 26.0 | 726 | 811 | 169 | 282 | 45 | 0 |

| | SAG RESISTANCE 1/64 In. | Milliliters WATER/100 gms of dry mix | SKINNING (lbs.) | | |
|---|---|---|---|---|---|
| | | | 0 | 5 | 10 |
| EXAMPLE 12 | 2.5 | 26.5 | >1200 | 570 | 295 |
| EXAMPLE 13 | 5.5 | 27.0 | >1200 | 884 | 200 |
| EXAMPLE 14 | 2.5 | 26.0 | >1200 | >1200 | 1200 |
| EXAMPLE 15 | 2.0 | 26.0 | >1200 | 932 | 1020 |

Examples 12 and 13 are wall mortars and can be compared with mortars of Examples 1–5 and the conventional wall mortars of Example 11. Examples 14 and 15 are floor mortars and can be compared with the mortars of Examples 6–10 and the conventional floor mortars of Example 11.

From a comparison of data the mortar formulations of the invention made without clay are superior to the prior art mortars. Further, mortar formulations of the invention which do not contain clay are only slightly less desirable as mortars than the clay-containing mortar formulation.

The basic reason that the clay containing formulation is superior to the formulation without clay is revealed

I claim:

1. In a dry-set mortar composition adapted to be mixed with water having in the dry state a composition of sand, Portland cement and a cellulose ether, the improvement which provides improved sag resistance and skinning properties, comprising the inclusion of 0.0070 to 0.0150 parts by weight anionic polyacrylamide and between 0.3–0.8 parts by weight sodium Bentonite Clay.

2. A dry-set mortar composition as in claim 1 further comprising the inclusion of polyvinyl alcohol.

3. A dry-set mortar composition as in claim 1 wherein the cellulose ether is methyl cellulose of 3,700–4,300 viscosity at 20° C., 2% aqueous solution and the methyl cellulose comprises about 0.5–0.6 parts by weight of the dry composition.

4. A dry-set mortar composition as in claim 2 wherein the composition in the dry state is about 50 parts by weight sand, 0.18 parts by weight polyvinyl alcohol, 0.3–0.8 parts by weight sodium Bentonite Clay, 0.6 parts by weight methyl cellulose having a viscosity of 3,700–4,300 at 20° C. 2% aqueous solution, between 0.0085 and 0.0150 parts by weight anionic polyacrylamide and the remainder of the composition in the dry state is Portland cement; the composition comprising 100 parts in total.

5. A dry-set mortar as in claim 2 wherein the composition in the dry state is about 60 parts by weight sand, 0.12 parts by weight polyvinyl alcohol, 0.10 parts by weight anti-foam, 0.08 parts by weight UREA, 0.120 parts by weight sodium Bentonite Clay, from 0.007 to 0.013 parts by weight polyacrylamide and the remainder of the dry composition is Portland cement; the composition comprising 100 parts in total.

* * * * *

UNITED STATES PATENT AND TRADEMARK OFFICE
CERTIFICATE OF CORRECTION

PATENT NO. :  4,402,752                                 Page 1 of 2

DATED      :  September 6, 1983

INVENTOR(S) : Joseph J. Chesney, Jr.

It is certified that error appears in the above-identified patent and that said Letters Patent is hereby corrected as shown below:

Col. 4, line 24, "of SEPARAN" should read -- is SEPARAN --

Col. 6, line 23, "Example 11 to 60" should read

-- Example 11 is 60 --.

Col. 1, line 65, change "A1118.1" to -- A118.1 --

Col. 2, line 50, change "elavational" to -- elevational --

Col. 4, line 4, change "component" to -- components --

Col. 4, line 14, change "conforming the" to -- conforming to the --

Col. 5, line 21, change "A1118.1-1967" to -- A118.1-1967 --

UNITED STATES PATENT AND TRADEMARK OFFICE
CERTIFICATE OF CORRECTION

PATENT NO. : 4,402,752                      Page 2 of 2

DATED       : September 6, 1983

INVENTOR(S) : Joseph J. Chesney, Jr.

It is certified that error appears in the above-identified patent and that said Letters Patent is hereby corrected as shown below:

Col. 5, line 60, change "A1118.4" to -- A118.4 --

Col. 6, line 22, change "fo" to -- of --.

*Signed and Sealed this*

*Fourteenth* Day of *August 1984*

[SEAL]

*Attest:*

GERALD J. MOSSINGHOFF

*Attesting Officer*        *Commissioner of Patents and Trademarks*